United States Patent [19]
Aono et al.

[11] 3,935,845
[45] Feb. 3, 1976

[54] IGNITION TIMING CONTROL DEVICE FOR AUTOMOTIVE IGNITION SYSTEM

[75] Inventors: Shigeo Aono, Sekimachi; Norio Mizuguchi, Yokosuka, both of Japan

[73] Assignees: Nissan Motor Company Limited, Yokohama; Hitachi Ltd., Tokyo, both of Japan

[22] Filed: June 28, 1974

[21] Appl. No.: 484,240

[30] Foreign Application Priority Data
June 30, 1973 Japan.................................. 48-73336

[52] U.S. Cl........................... 123/117 R; 123/32 EA
[51] Int. Cl.².............................................. F02P 5/04
[58] Field of Search...................... 123/117 R, 32 EA

[56] References Cited
UNITED STATES PATENTS

| | | | |
|---|---|---|---|
| 3,521,611 | 7/1970 | Finch | 123/117 R |
| 3,592,178 | 7/1971 | Schiff | 123/117 R |
| 3,718,126 | 2/1973 | Oishi et al. | 123/117 R |
| 3,796,197 | 3/1974 | Locher et al. | 123/117 R |

*Primary Examiner*—Wendell E. Burns
*Assistant Examiner*—Joseph A. Cangelosi

[57] ABSTRACT

A fully transistorized control device for controlling spark ignition timings in an ignition system of an automotive internal combustion engine, characterized in that the ignition timings are advanced or retarded in accordance with the movement of the carburetor throttle valve during acceleration or deceleration of the vehicle and with the revolution speed of the engine during deceleration of the vehicle.

9 Claims, 4 Drawing Figures

IGNITION TIMING CONTROL DEVICE FOR AUTOMOTIVE IGNITION SYSTEM

The present invention relates to an ignition system of an automotive vehicle and, more particularly, to a device for controlling spark ignition timings of an internal combustion engine of an automotive vehicle.

The charge of air and vaporized fuel is fired in a gasoline powered internal combustion engine by means of arc which is produced across a spark plug gap in the ignition system, as is well known in the art. One of the most important requirements of such an ignition system is to correctly determine the spark ignition timings for the purpose of achieving efficient operation of the internal combustion engine throughout the range of speed and operating conditions of the engine and minimizing toxic pollutants contained in exhaust gases of the engine. The spark ignition timing of the ignition system is, therefore, controlled in accordance with the engine speed and the load on the engine so as to achieve optimum spark ignition characteristics which are proper to an engine design. Control mechanisms have thus incorporated into the ignition system so as to automatically advance and retard the spark timing as conditions of the engine require. Such mechanisms include a centrifugal spark advance mechanism using spring-loaded weights which are moved by a centrifugal force developed by the revolution of a distributor drive shaft so that the ignition timing is varied from no advance at low engine speeds to full advance at high engine speeds. Another ignition timing control mechanism which is known is an intake-manifold spark advance mechanism which uses a spring-loaded diaphragm responsive to vacuum developed in an intake manifold of the engine. The vacuum spark advance mechanism is usually employed in combination with the centrifugal spark advance mechanism so that the ignition timing advanced by the latter is further advanced by the former during part throttle operation of the engine.

To cope with the user demand for highly sophisticated engine performances and to solve the vehicular air pollution problems, it is required that the ignition timings be controlled more strictly by realizing the optimum spark advance schemes which may be tailored to individual models and makes of the engines. Insofar as the conventional expedients to control the ignition timings in a mechanical fashion is to be relied upon, however, it is practically unfeasible to achieve the ignition timings which are optimum for various operating conditions of the internal combustion engines because of the prohibitively complicate and costly mechanisms which would be involved. The present invention contemplates elimination of these drawbacks which have thus far been inherent in the prior art ignition system.

It is, therefore, an important object of the present invention to provide an improved spark ignition control device which is simple in construction and which is nevertheless capable of providing optimum spark advance characteristics.

To achieve this purpose, the present invention proposes an electric control device which is responsive to prescribed operating conditions of the engine for advancing and retarding the spark ignition timing as such conditions call for.

In accordance with the present invention, such a control device comprises first voltage generating means responsive to velocity of movement of a throttle valve in an induction unit of the engine for producing a first output voltage proportional to the detected velocity of the throttle valve movement if and when the throttle valve is being moved toward full throttle position or a second output voltage proportional to the detected throttle valve movement if and when the throttle valve is being moved to closed throttle position, second voltage generating means responsive to revolution speed of a crankshaft of the engine for producing an output voltage proportional to the detected crankshaft revolution speed, first comparing means responsive to the first output voltage of the first voltage generating means for comparing the first output voltage with a first fixed reference voltage and producing a first signal when the former is higher than the latter, second comparing means responsive to the second output voltage of the first voltage generating means for comparing the second output voltage with a second fixed reference voltage and producing a second signal when the former is higher than the latter, third comparing means responsive to the output voltage of the second voltage generator for comparing the output voltage of the second voltage generator with a second fixed reference voltage and producing a third signal when the former is lower than the latter, a logical circuit connected to output terminals of the first and third comparing means for producing a fourth signal in the presence of at least one of the first and third signals, a memory circuit having a set terminal connected to an output terminal of the second comparing means and a reset terminal connected to an output terminal of the logical circuit for producing a fifth signal when triggered by the second signal until the fourth signal is produced from the logical circuit, and a spark-advance control circuit responsive to the first or fifth signal and to an ignition timing control signal related to or synchronized with the revolution of the engine crankshaft for producing a high-tension surge at a timing which is dictated by the ignition timing control signal and which is advanced or retarded by the first or fifth signal from the first comparing means or the memory circuit, respectively.

The spark ignition timing control device according to the present invention may further comprise waveform modying means connected between the first voltage generating means and the first comparing means and responsive to the first output voltage of the first voltage generating means, the waveform modifying means being operative to multiply time duration of the first output voltage for delivering to the first comparing means an output voltage having an amplitude substantially equal to that of the first output voltage and a duration which is larger than that of the first output voltage.

The features and advantages of the spark ignition timing control device according to the present invention will become more apparent from the following description taken in conjunction with the accompanying drawings, in which.

Figure 1:
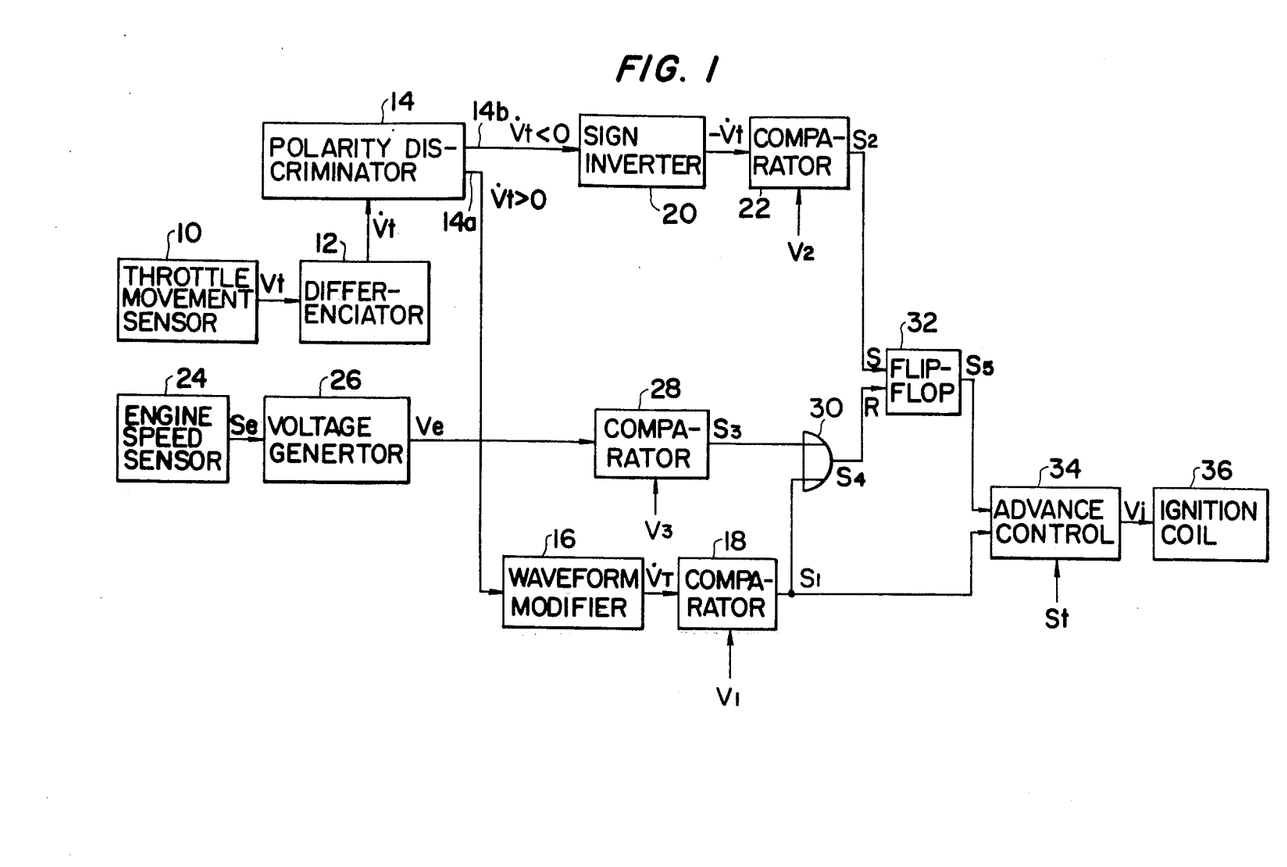
FIG. 1 is a block diagram which shows an overall electric arrangement constituting a preferred embodiment of the ignition timing control device according to the present invention.
Figure 2A:
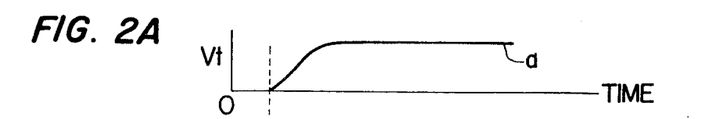
FIG. 2 is a diagram which shows waveforms of voltages and signals produced in various parts of the circuit arrangement illustrated in FIG. 1.
Figure 2B:
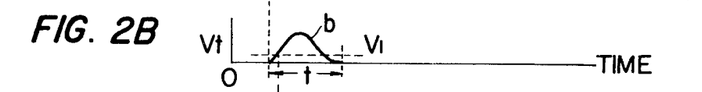
Figures 2C, 2D:
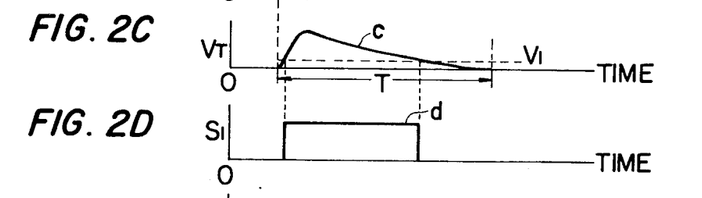
Figure 2E:
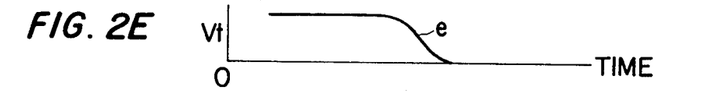
Figures 2F, 2G:
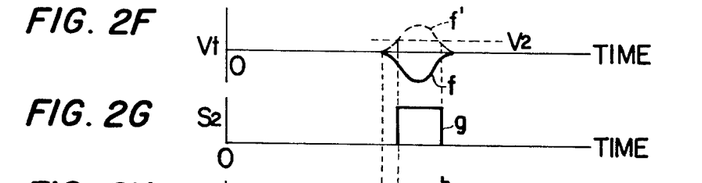
Figures 2H, 2I:
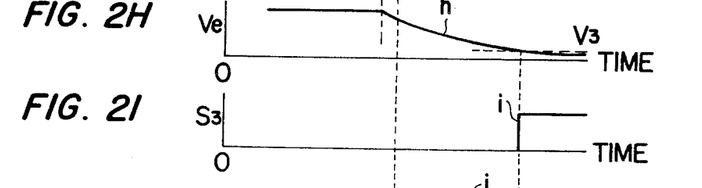
Figure 2J:
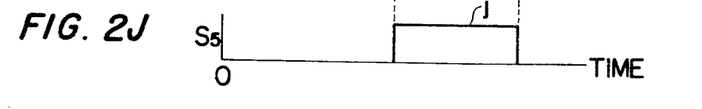

Reference will now be made to the accompanying drawings, first to FIG. 1. The ignition timing control device embodying the present invention is incorporated into an ignition system of an automotive internal combustion engine including a throttle valve in a charge induction unit or carburetor and a crankshaft from which the power output of the engine is delivered, though not shown in the drawings. The throttle valve in the induction unit is movable or rotatable between a closed throttle position to provide a minimum throttle opening area and a full throttle position to provide a maximum throttle opening position. The throttle valve is driven between the closed and full throttle positions through a part-throttle position by means of an accelerator pedal, as is well known. As illustrated in FIG. 1, the ignition timing control comprises a throttle movement sensor 10 responsive to movement of the throttle valve toward the closed or full throttle position, producing an output voltage $\dot{V}t$ which is proportional to an angular displacement of the throttle valve when the throttle valve is moved or rotated in either direction. The throttle movement sensor 10 has an output terminal connected to an input terminal of a differentiating circuit 12 which is operative to differentiate the output voltage $Vt$ of the throttle movement sensor 10 with respect to time and which produces an output voltage $\dot{V}t$ which is proportional to the velocity of the throttle valve being moved toward the closed or full throttle position. If, in this instance, the output voltag $Vt$ produced by the throttle movement sensor 10 is assumed to have a waveform $a$ indicated in the graph (A) of FIG. 2, then the differentiating circuit 12 will produce an output voltage $\dot{V}t$ which has a waveform $b$ indicated in the graph (B) of FIG. 2. The output voltage $\dot{V}t$ thus delivered from the differentiating circuit 12 is fed to an input terminal of a polarity discriminating circuit 14 which has first and second output terminals 14a and 14b, respectively. The polarity discriminating circuit 14 is operative to discriminate the polarity of the voltage $\dot{V}t$ supplied thereto from the differentiating circuit 12 and delivers an output voltage $\dot{V}t$ from the first output terminal 14a if the voltage $\dot{V}t$ fed from the differentiating circuit 12 is of the positive polarity and from the second output terminal 14b if the voltage $\dot{V}t$ fed from the differentiating circuit 12 is of the negative polarity. In the circuit arrangement herein shown, it is assumed by way of example that the positive output voltage $Vt$ delivered from the first output terminal 14a of the polarity discriminating circuit 14 is representative of a velocity of the throttle valve being moved toward the full throttle position from the closed or part throttle position whereas the negative output voltage $\dot{V}t$ delivered from the second output terminal 14b of the polarity discriminating circuit 14 is representative of a velocity of the throttle valve which is being moved toward the closed throttle position from the full or part throttle position.

The first output terminal 14a of the polarity discriminating circuit 14 is connected to an input terminal of a waveform modifying circuit 16 which is arranged to multiply or prolong the duration of the positive output voltage $\dot{V}t$ from the first output terminal 14a of the polarity discriminating circuit 14, thereby producing an output voltage $\dot{V}_T$ having a waveform $c$ which is indicated in the graph (C) of FIG. 2. As will be seen in the graphs (B) and (C) of FIG. 2, the output voltage $\dot{V}_T$ produced by the waveform modifying circuit 16 has a duration T which is longer than a duration $t$ of the output voltage $\dot{V}t$ delivered from the first output terminal 14a of the polarity discriminating circuit 14.

The waveform modifying circuit 16 has an output terminal connected to an input terminal of a first comparator 18 which has another input terminal connected to a source (not shown) of a first constant reference voltage $V_1$. The first comparator 18 is operative to compare the positive output voltage $\dot{V}_T$ from the waveform modifying circuit 16 and produces a first control signal $S_1$ of logical "1" when the voltage $\dot{V}_T$ is higher than the first constant reference voltage $V_1$, as indicated by a waveform $d$ in the graph (D) of FIG. 2. The first constant reference voltage $V_1$ is predetermined in such a manner as to be in correspondence with a prescribed velocity of movement of the throttle valve moved during acceleration of the vehicle.

On the other hand, the second output terminal 14b of the polarity discrminating circuit 14 is connected to a sign inverter 20 which is adapted to invert the polarity of the negative voltage $\dot{V}t$ fed from the second output terminal 14b of the polarity discriminating circuit 14, producing an output voltage $-\dot{V}t$ which is positive in polarity but which is equal in absolute valve to the output voltage $\dot{V}t$ from the differentiating circuit 12. If, in this instance, the output voltage $Vt$ produced by the throttle movement sensor 10 is assumed to have a waveform $e$ indicated in the graph (E) of FIG. 2, then the differentiating circuit 14 will deliver an output voltage $\dot{V}t$ having a waveform $f$ indicated in the graph (F) of FIG. 2 so that the output voltage $-\dot{V}t$ from the sign inverter 20 has a waveform $f'$ having an inverted polarity as indicated by a dotted curve in the graph (F) of FIG. 2. The positive output voltage $-\dot{V}t$ thus delivered from the sign inverter 20 is fed to a second comparator 22 to which a second constant reference voltage $V_2$ is constantly applied from a constant voltage source (not shown). The second comparator 22 is, thus, operative to compare the output voltage $-\dot{V}t$ from the sign inverter 22 with the second constant reference voltage $V_2$ and produces a second control signal $S_2$ of logical 1 when the voltage $-\dot{V}t$ is higher than the second constant reference voltage $V_2$ which is positive in polarity, as indicated by a waveform $g$ in the graph (G) of FIG. 2. The second constant reference voltage $V_2$ is predetermined in such a manner as to be in correspondence with a prescribed velocity of movement of the throttle valve moved during acceleration of the vehicle.

The ignition timing control device embodying the present invention further comprises an engine speed sensor 24 which is responsive to the revolution speed of the engine and which produces a pulse train $Se$ having a pulse repetition frequency which is proportional to the detected revolution speed of the engine. The pulse train $Se$ is fed to a voltage generating circuit 26 which is adapted to produce an output voltage $Ve$ proportional to the repetition frequency of the pulse train $Se$, viz., to the detected revolution speed of the engine. If, in this instance, the vehicle is being decelerated, the output voltage $Ve$ delivered from the voltage generating circuit 26 will have a waveform $h$ indicated in the graph (H) of FIG. 2. The voltage generating circuit 24 has an output terminal connected to an input terminal of a third comparator 28 which has another input terminal connected to a source (not shown) of a third constant reference voltage $V_3$. The third comparator 28 is operative to compare the voltage $Ve$ fed from the voltage generating circuit 26 with the third constant reference voltage $V_3$ and produces a third control signal $S_3$ of logical 1 having a waveform $i$ indicated in the graph (I) of FIG. 2 when the voltage $Ve$ is higher than the refrence voltage $V_3$ as seen in the graph (H) of FIG. 2. The third constant reference voltage $V_3$ is predetermined in such a manner as to be in correspondence with a prescribed engine speed of a relatively low level.

The first and third comparators 18 and 28 have respective output terminals connected to input terminals of a logical "or" gate circuit 30 which is adapted to produce a fourth control signal $S_4$ of logical 1 when at least one of the first and third control signals $S_1$ and $S_3$ of logical 1 is fed thereto from the first comparator 18 and/or the third comparator 28. A suitable memory circuit such as for example a flip-flop circuit has a set terminal connected to an output terminal of the second comparator 22 and a reset terminal connected to an output terminal of the logical OR gate circuit 30. The flip-flop circuit 32 is thus adapted to produce a fifth control signal $S_5$ of logical 1 once it is supplied with the second control signal $S_2$ of logical 1 from the second comparator 22 and to be reset or cleared when the fourth control signal $S_4$ of logical 1 is delivered from the logical OR gate circuit 30, viz., in the absence of the first control signal $S_1$ of logical 1 and/or the third control signal $S_3$ of logical 1, as will be seen from a waveform $j$ indicated in the graph (J) of FIG. 2.

The flip-flop circuit 32 has an output terminal connected to a first input terminal 34$a$ of a spark advance control circuit 34. The spark advance control circuit 34 has a second input terminal 34$b$ connected to the output terminal of the first comparator 18 and a third input terminal 34$c$ connected to a source (not shown) of a signal $St$ which is synchronized with the revolution of the crankshaft of the engine. The spark advance control circuit 34 is thus supplied with the first or fifth control signal $S_1$ or $S_5$ from the first comparator 18 or the flip-flop circuit 32 as well as the ignition timing signal $St$ and produces a high tension surge $Vi$ at timings which are dictated by the ignition timing signal $St$ and advanced or retarded by the spark timing control signal $S_1$ or $S_5$. The high-tension surge $Vi$ is supplied to a primary winding (not shown in FIG. 1) of an ignition coil 36.

The operation of the ignition timing control device thus arranged will now be described with concurrent reference to FIGS. 1 and 2.

During acceleration or deceleration of the vehicle, the engine is in a transient operational condition with the throttle valve of the induction unit being rapidly moved toward the full throttle or closed throttle position. Such movement of the throttle valve is responded to by the throttle movement sensor 10 which accordingly produces an output voltage $Vt$ proportional to the amount of angular displacement of the throttle valve. If, in this instance, the throttle valve is moved toward the full throttle position during acceleration of the vehicle, then the throttle movement sensor 10 will produce an increasing output voltage $Vt$ having a waveform $a$ indicated in the graph (A) of FIG. 2 so that the differentiating circuit 12 produces a positive output voltage $\dot{V}_t$ having a waveform $b$ indicated in the graph (B) of FIG. 2. If, conversely, the throttle valve is moved toward the closed throttle position during deceleration of the vehicle, then the throttle movement sensor 10 will produce a drooping output voltage $Vt$ having a waveform $e$ indicated in the graph (E) of FIG. 2. The differentiating circuit 12 will accordingly produce a negative output voltage $\dot{V}t$ having a waveform $f$ indicated in the graph (F) of FIG. 2.

Assuming that the vehicle is being accelerated and accordingly the positive output voltage $\dot{V}t$ having the waveform $b$ shown in the graph (B) of FIG. 2 is being produced by the differentiating circuit 12, the polarity discriminating circuit 14 delivers a positive output voltage $\dot{V}t$ from its first output terminal 14$a$. The output voltage $\dot{V}t$ thus delivered from the first output terminal 14$a$ of the polarity discriminating circuit 14 has a duration $t$ which is equal to the period of time for which the throttle valve is being moved toward the full throttle position. The engine is, however, made operative to produce an increased torque and accordingly the vehicle starts to be accelerated with a considerable amount of time delay after the throttle valve has initially been moved for accelerating the vehicle. To make it possible to have the spark ignition timing advanced throughout the condition in which the engine is thus held in a transient condition after the throttle valve has been moved toward the full throttle position, the duration $t$ of the voltage delivered from the first output terminal 14$a$ of the polarity discriminating circuit 14 is multiplied or otherwise prolonged by means of the waveform modifying circuit 16 to duration of the voltage $\dot{V}_t$ having a waveform $c$ as seen in the graph (C) of FIG. 2. The output voltage $\dot{V}_T$ of the waveform modifying circuit 16 is fed to the first comparator 18 and is thereby compared with the first constant reference voltage $V_1$. The first comparator 18 produces the first control signal $S_1$ of logical 1 if and when the voltage $\dot{V}_T$ is higher than the reference voltage $V_1$. The duration $T_1$ of the control signal $S_1$ of logical 1 can be varied by varying the first constant reference voltage $V_1$ applied to the first comparator 18. The first control signal $S_1$ is supplied to the spark advance control circuit 34 for modifying the ignition timing signal $St$ so that the spark ignition timing is controlled in accordance with the control signals $S_1$ and $St$.

When, on the other hand, the vehicle is to be decelerated, the differentiating circuit 12 will produce a negative output signal $\dot{V}t$ as previously mentioned. The polarity discriminating circuit 14 thus delivers an output voltage $\dot{V}t$ from its second output terminal 14$b$. The output voltage $\dot{V}t$ thus delivered from the polarity discriminating circuit 14 is inverted in polarity by means of the sign inverter 20 which accordingly produces a positive output voltage $-\dot{V}t$ having a waveform $f'$ indicated by dotted curve in the graph (F) of FIG. 2. The positive output voltage $-\dot{V}t$ is compared with the second constant reference voltage $V_2$ in the second comparator 22 which produces the second control signal $S_2$ of logical 1 if and when the voltage $-\dot{V}t$ is higher than the reference voltage $V_2$.

When the vehicle is thus being decelerated, the voltage generating circuit 26 produces an output voltage $Ve$ which is proportional to the decreasing revolution speed of the engine as indicated by a waveform $h$ in the graph (H) of FIG. 2. The output voltage $Ve$ thus delivered from the voltage generating circuit 26 is compared with the third constant reference voltage $V_3$ by the third comparator 28 so that the third control signal $S_3$ of logical 1 is delivered from the third comparator 28 if and when the voltage $Ve$ proportional to the engine speed is lower than the reference voltage $V_3$.

When, now, the second control signal $S_2$ of logical 1 is delivered from the second comparator 22 in the absence of the third control signal $S_3$ of logical 1 at the output terminal of the third comparator 28 and accordingly in the absence of the fourth control signal $S_4$ of logical 1 at the output terminal of the logical OR gate circuit 30, the flip-flop circuit 32 is triggered to produce the fifth control signal $S_5$ of logical 1 so that the spark advance control circuit 34 is operative to control the spark ignition timing in accordance with the fifth control signal $S_5$ and the timing control signal $St$. When the engine revolution speed is thereafter decreased below a predetermined level and consequently the voltage $Ve$ applied third comparator 28 becomes lower than the third constant reference voltage $V_3$ as seen in the graph (H) of FIG. 2, then the third control signal $S_3$ of logical 1 is produced from the third comparator 28 so that the logical OR gate circuit 30 becomes operative to produce the fourth control signal $S_4$ of logical 1. As a consequence, the flip-flop circuit 32 is reset or cleared so that the ignition timing is controlled by the ignition timing signal $St$ synchronized with the engine revolution in the absence of the fifth control signal $S_5$ from the flip-flop circuit 32 and the first control signal $S_1$ from the first comparator 18. If the throttle valve is moved toward the full throttle position when the fifth control signal $S_5$ is being produced from the flip-flop circuit 32, then the first comparator 18 is instantly made operative to produce the first control signal $S_1$ so that the logical OR gate circuit 30 produces the fourth control signal $S_4$ to reset the flip-flop circuit 32 irrespective of the engine revolution speed. The supply of the fifth control signal $S_5$ is consequently terminated and instead the first control signal $S_1$ of logical 1 is applied to the spark advance control circuit 34.

The first control signal $S_1$ is thus delivered to the spark advance control circuit 34 throughout the transient operational condition of the engine during acceleration of the vehicle, because the duration of the output voltage $\dot{V}t$ produced from the differentiating circuit 12 is multiplied by the waveform modifying circuit 16. During deceleration of the vehicle, the fifth control signal $S_5$ is fed to the spark advance control circuit 34 for a period of time starting at a time at which the throttle valve is moved toward the closed throttle position and terminating at a time at which the revolution speed of the engine is reduced to a predetermined level.

Figure 3:
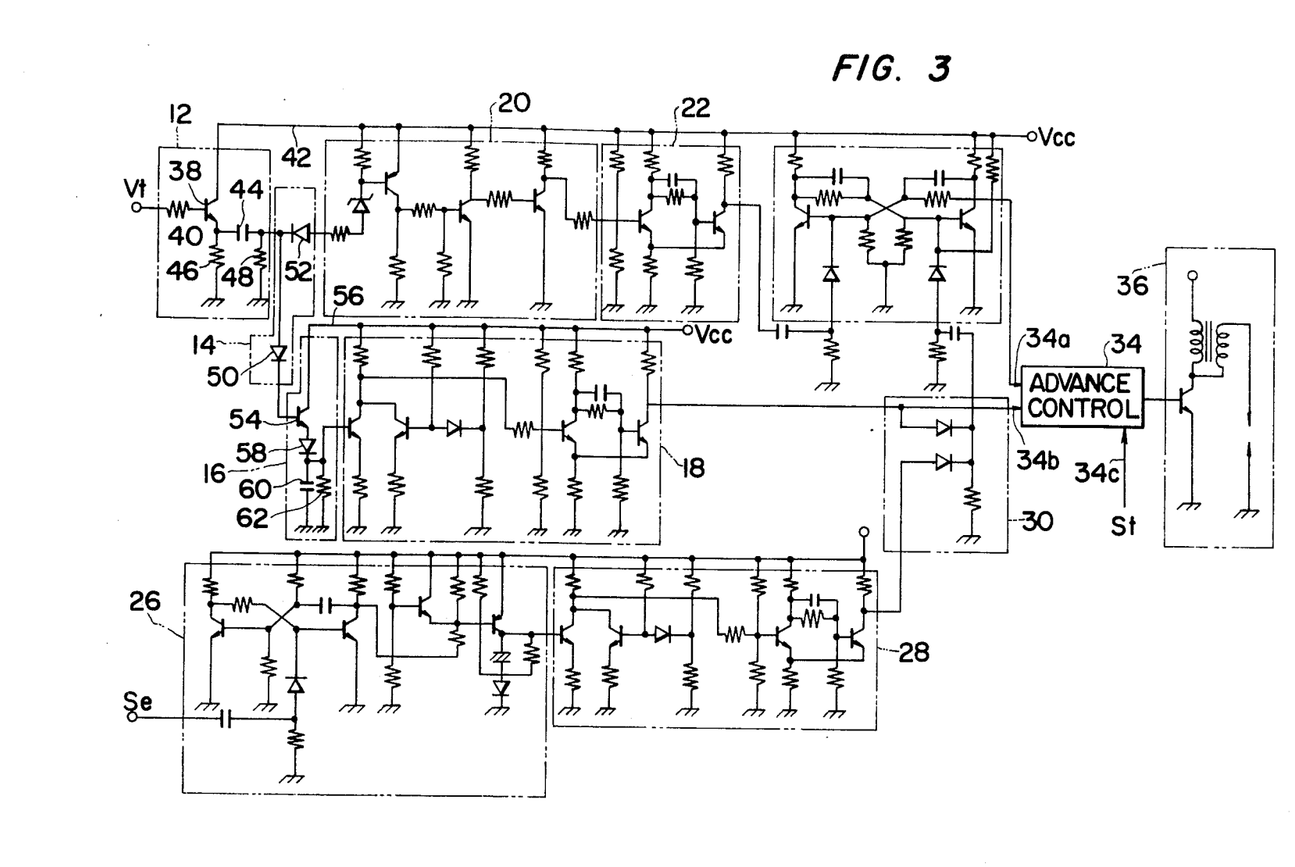
FIG. 3 is a diagram which shows an example of a detailed electric circuit of the arrangement schematically illustrated in FIG. 1.

FIG. 3 illustrates details of the circuit arrangements of the differentiating circuit 12, the polarity discriminating circuit 14, the waveform modifying circuit 16, the signal inverter 20, the voltage generating circuit 26, the first, second and third comparators 18, 22 and 28, the logical "OR" gate circuit 20, the flip-flop circuit 32 and the ignition coil circuit 36 which have been illustrated in block forms in FIG. 1. Referring to FIG. 3, the differentiating circuit 12 is shown as comprising a transistor 38 having a base connected through a resistor 40 to the output terminal of the throttle movement sensor 10. The transistor 38 has a collector electrode connected to a bus line 42 on which a constant voltage $Vcc$ is impressed and an emitter electrode connected through a capacitor 44 to the output terminal of the differentiating circuit 12. The electrodes of the capacitor 44 are grounded through resistors 46 and 48. When the output voltage $Vt$ produced by the throttle movement sensor 10 is applied through the resistor 40 to the base of the transistor 38, the transistor 38 becomes conductive so that a voltage proportional to the input voltage $Vt$ is produced across the resistor 46. The voltage thus produced across the resistor 46 is differentiated with respect to time by the combination of the capacitor 44 and the resistor 48 so that the differentiating circuit 12 deliveres the output voltage $\dot{V}t$ to the polarity discriminating circuit 14. The polarity discriminating circuit 14 is shown to comprise a parallel combination of first and second diodes 50 and 52. The first diode 50 has an anode terminal connected to the output terminal of the differentiating circuit 12 and a cathode terminal connected to the input terminal of the waveform modifying circuit 16 whereas the second diode 52 has a cathode terminal connected to the output terminal of the differentiating circuit 12 and an anode terminal connected to the input terminal of the signal inverter 20. During acceleration of the vehicle, the polarity discriminating circuit is supplied with the voltage $\dot{V}t$ of the positive polarity from the differentiating circuit 12 so that the first diode 50 is forwardly biased and the second diode 52 reversely biased. It therefore follows that the positive output voltage $\dot{V}t$ from the differentiating circuit 12 is passed through the first diode 50 to the waveform modifying circuit 16. During deceleration of the vehicle, on the contrary, the polarity discriminating circuit 14 is supplied with the voltage $\dot{V}t$ of the negative polarity from the differentiating circuit 12 so that the first diode 50 is reversely biased and the second diode 52 forwardly biased. The negative output voltage $\dot{V}t$ delivered from the differentiating circuit 12 is thus passed to the signal inverter 20 through the second diode 52 of the polarity discriminating circuit 14.

The waveform modifying circuit 16 is shown as comprising a transistor 54 which has a base connected to the cathode terminal of the first diode 50 of the polarity discriminating circuit 14 and a collector electrode connected through a bus line 56 to the source of the constant voltage $Vcc$. The emitter electrode of the transistor 54 is connected through a diode 58 to one electrode of a capacitor 60, the other electrode of which is grounded. The capacitor 60 is thus charged when the transistor 54 is made conductive by the voltage $\dot{V}t$ supplied to the base of the transistor 54 from the polarity discriminating circuit 14. The charges stored on the capacitor 60 are discharged through a resistor 62 so that the voltage developed across the resistor 62 is delivered from the output terminal of the waveform modifying circuit 16. The duration of the output voltage $\dot{V}_T$ thus delivered from the waveform discriminating circuit 16 can be prescribed by selecting the time constant dictated by the combination of the capacitor 60 and the resistor 62. Where desired, the resistor 62 may be made variable so that the duration of the output voltage $\dot{V}_T$ from the waveform modifying circuit 16 is made variable.

The constructions and operations of the remaining circuit arrangements including the sign inverter 20, the capacitors 18, 22 and 28, the logical OR gate circuit 30 and the flip-flop circuit 32 will be self-explanatory to those skilled in the art from the illustration of FIG. 3. For this reason and because of the fact that such circuit arrangements are subject to various modifications, description as to the details of the remaining circuit arrangements will now be herein incorporated.

Although the waveform modifying circuit 16 has been shown to be connected between the polarity discriminating circuit 14 and the first comparator 18, such is merely by way of example and, thus, the waveform modifying circuit 16 may have an input terminal connected to the first comparator 18 and an output terminal connected to the logical OR gate circuit 30. In this instance, the waveform modifying circuit 16 will be operative to multiply the time duration of the output signal delivered from the first comparator 18 and pass the thus modified signal to the logical OR gate circuit 30. Likewise, the sign inverter 20 which has been shown to be connected between the polarity discriminating circuit 14 and the second comparator 22 may be so arranged as to have an input terminal connected to the comparator circuit 222 and an output terminal connected to the set terminal of the flip-flop circuit 32 so that the polarity of the signal delivered from the comparator 22 is inverted by the sign inverter 22.

Figure 4:
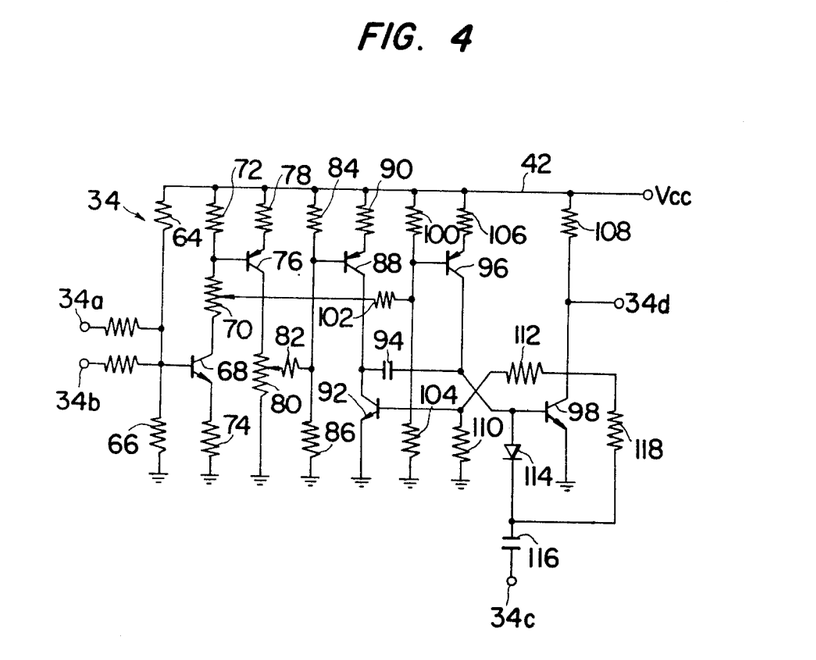
FIG. 4 is a diagram which shows an example of the spark timing circunit forming a final part of the arrangement illustrated in FIG. 1.

FIG. 4 illustrates an example of the detailed circuit arrangement of the spark advance control circuit 34 incorporated into the ignition timing control device shown in FIG. 1. The spark advance control circuit 34 thus has a first input terminal 34a connected to the output terminal of the flip-flop circuit 32, a second input terminal 34b connected to the output terminal of the first comparator 18, a third input terminal 34c connected to the source of the ignition timing control signal $St$, and an output terminal 34d connected to the transistorized ignition coil circuit 36. The first and second input terminals 34a and 34b are connected to the bus line 42 through a resistor 64 and grounded through a resistor 66. The input terminals 34a and 34b are further connected to a base of a first transistor 68 having a collector electrode connected to the bus line 42 through a variable resistor 70 and a resistor 72 and an emitter electrode which is grounded through a resistor 74. A second transistor 76 has a base connected to a node between the variable resistor 70 and the resistor 72, an emitter electrode connected to the bus line 42 through a resistor 78 and a collector electrode which is grounded through a variable resistor 80. The variable resistor 80 has a wiper which is connected to the bus line 42 through resistors 82 and 84 and which is connected to ground through a resistor 86. To a node between the resistors 82 and 84 is connected a base of a third transistor 88 which has an emitter electrode connected to the bus line 42 through a resistor 90. The collector electrode of the third transistor 88 is connected to the collector electrode of a fourth transistor 92 which has an emitter electrode connected to ground. The collector electrodes of the third and fourth transistors 88 and 90 are further connected to one electrode of a capacitor 94 the other electrode of which is connected to the collector electrode of a fifth transistor 96 and to the base of a sixth transistor 98. The fifth transistor 96 has a base connected through a resistor 100 to the bus line 42 and through a resistor 102 to the wiper of the variable resistor 70 and grounded through a resistor 104. The emitter electrode of the fifth transistor 96 is connected to the bus line 42 through a resistor 106. The sixth transistor 98 has an emitter electrode connected to ground and a collector electrode connected to the output terminal 34d of the control circuit 34 and through a resistor 108 to the bus line 42. The base of the fourth transistor 92 is grounded through a resistor 110 and connected through a resistor 112 to the collector electrode of the sixth transistor 98 and the output terminal 34d of the control circuit 34. To a node between the capacitor 94 and the collector electrodes of the fifth and sixth transistors 96 and 98 is connected a diode 114 which has a cathode terminal connected through a capacitor 116 to the third input terminal 34c of the control circuit 34 and through a resistor 118 to the collector electrode of the sixth transistor 98. A mono-stable multi-vibrator is thus constructed by the transistors 92 and 98, the capacitors 94 and 114 and the resistors 110, 112, and 118. The mono-stable multi-vibrator cooperates with a first constant-current circuit which is made up of the transistor 88 and the resistors 84, 86 and 90 and a second constant-current circuit which is made up of the transistor 96 and the resistors 100, 104 and 106.

When, thus, the transistor 98 of the mono-stable multi-vibrator is conductive in the absence of a trigger signal at the third input terminal 34c of the control circuit 34, the potential on the collector electrode of the transistor 98 is on a zero level so that no output signal is delivered from the output terminal 34d of the control circuit 34. When, under these conditions, a trigger signal of the negative polarity is impressed on the base of the transistor 98 from the third input terminal 34c of the control circuit 34 through the capacitor 116 and the diode 114, then the transistor 98 is made non-conductive with the result that the transistor 92 becomes conductive. The potential on the collector electrode of the transistor 92 is consequently on a zero level so that the potential on the electrode of the capacitor 94 connected to the base of the transistor 98 drops to a negative polarity. The capacitor 94 is thus charged by the action of the second constant-current circuit including the transistor 96 until the transistor 98 of the mono-stable multi-vibrator is turned off. If, therefore, the ratio between the currents determined by the first and second constant-current circuits is maintained constant, then the ratio between the time intervals of the trigger signals appearing at the third input terminal 34c of the control circuit 34 and the durations of the signals appearing at the output terminal 34d of the control circuit 34 will be maintained constant irrespective of the revolution speed of the engine. The ratio between the currents dictated by the two constant-current circuits is varied by the signals appearing at the first and second input terminals 34a and 34b of the control circuit 34 and, for this reason, the spark advance timing can be controlled by the signals delivered to the input terminals 34a and 34b from the flip-flop circuit 32 and the first comparator 18 shown in FIG. 1. Since the construction and operation of the spark advance control circuit 34 herein shown will be self-explanatory and since such are rather immaterial for the understanding of the gist of the present invention, no further description thereof will be herein necessary.

It will now be understood from the foregoing description that the ignition timing control device herein proposed is useful in achieving optimum ignition spark advance characteristics during transient operational conditions of the engine as during acceleration and deceleration of the vehicle. The ignition timing control device according to the present invention is thus expected to contribute to reducing the toxic compounds in the vehicle exhaust gases to minimum without sacrificing the power output of the engine.

Only one preferred embodiment of the ignition timing control device has thus far been described for illustrative purposes. Such an embodiment is, however, subject to modification and change without departing from the scope of the present invention. The polarity discriminating circuit 14 has, for example, been described as being adapted to produce a positive output voltage in response to accelerating conditions of the vehicle and a negative output voltage in response to decelerating conditions of the vehicle, the polarities of the output voltages to be delivered from the polarity discriminating circuit may be inverted so that the polarity discriminating circuit is operative to produce a positive output voltage when the throttle valve in the induction unit is being moved toward the closed throttle position and a negative output voltage when the throttle valve is being moved toward the full throttle position. In this instance, the sign inverter 20 which has been shown as being connected between the second output terminal of the polarity discriminating circuit 14 and the second comparator 22 should be connected between the first output terminal of the polarity discriminator 14 and the waveform modifying circuit 16. Furthermore, the voltage generating circuit 26 has been assumed as being adapted to produce an output voltage $V_e$ proportional to the revolution speed of the engine so that the third control signal $S_3$ of logical 1 is produced from the third comparator 28 when the voltage $V_e$ is lower than the third constant reference voltage $V_3$. This is, however, merely by way of example and, therefore, the voltage generating circuit 26 may be so arranged as to produce an output voltage which is inversely proportional to the engine revolution speed detected by the engine speed sensor 24. In this instance, the third comparator 28 should be arranged to deliver an output signal of logical 0 when the voltage supplied from the voltage generating circuit 26 is lower than the third reference voltage $V_3$ and an output signal of logical 1 when the voltage from the voltage generating circuit 26 is higher than the reference voltage $V_3$.

1. A spark timing control device for an internal combustion engine system having a throttle valve movable in its intake port, which comprise:
  a throttle velocity signal generating means generating a throttle velocity signal representative of the velocity of the throttle movement;
  first means producing a first signal in response to said velocity signal when said velocity signal exceeds a positive predetermined level;
  second means producing a second signal in response to said velocity signal when said velocity signal lowers below a negative predetermined level;
  third means producing a third signal when the engine speed lowers below a predetermined value; and
  fourth means performing ignition timing advance control when it receives said second signal and when it receives said first signal in the absence of said third signal.

2. A spark timing control device as claimed in claim 1, in which said throttle velocity signal generating means comprises:
  a throttle movement sensor responsive to movement of the throttle valve and producing an output voltage proportional to angular displacement of the throttle valve; and
  a differentiating circuit differentiating the output voltage received from the throttle valve movement sensor with respect to time so as to produce said throttle velocity signal.

3. A spark timing control device as claimed in claim 1, in which said first means comprises:
  first comparing means producing said first signal when it receives a voltage larger than said positive predetermined level; and polarity discriminating means applying said throttle velocity signal to said first comparing means when said throttle velocity signal is positive.

4. A spark timing control device as claimed in claim 3, in which said first means further comprises:
  waveform-modifying means connected between said first comparing means and said polarity discriminating means for stretching in time said voltage from said polarity discriminating means.

5. A spark timing control device as claimed in claim 1, in which said second means comprises:
  second comparing means producing said second signal when it receives a voltage smaller than said negative predetermined level; and
  polarity discriminating means applying said throttle velocity signal to said second comparing means when said throttle velocity signal is negative.

6. A spark timing control device as claimed in claim 5, in which said second comparing means comprises:
  a sign inverter inverting the sign of said throttle velocity signal; and
  a comparator producing said second signal when the voltage of the inverted throttle signal exceeds a predetermined voltage.

7. A spark timing control device as claimed in claim 1, in which said third means comprises:
  a voltage generating means responsive to an engine speed snd producing a voltage proportional to the engine speed; and
  third comparing means responsive to the engine and producing said third signal when the voltage proportional to the engine speed lowers below said predetermined value.

8. A spark timing control device as claimed in claim 1, in which said fourth means comprises:
  an OR gate receiving said first and third signals and producing a fourth signal when at least one of said first signal and said third signal is received;
  a memory circuit receiving said second and fourth signal for producing a fifth signal when triggered by said second signal until the appearance of said fourth signal; and
  an advance control circuit receiving said first signal and fifth signals and an uncontrolled ignition timing signal related to the engine speed for performing the advance control.

9. A spark timing control device as claimed in claim 8, in which said advance control circuit comprises:
  a monostable multivibrator providing an ignition timing control signal at the end of the quasi-stable period thereof; and
  a constant current circuit means keeping constant the ratio between said quasi-stable period and the stable period of said monostable multivibrator and controlling said ratio in response to either said first signal or said fifth signal.

\* \* \* \* \*